United States Patent Office 2,708,003
Patented May 10, 1955

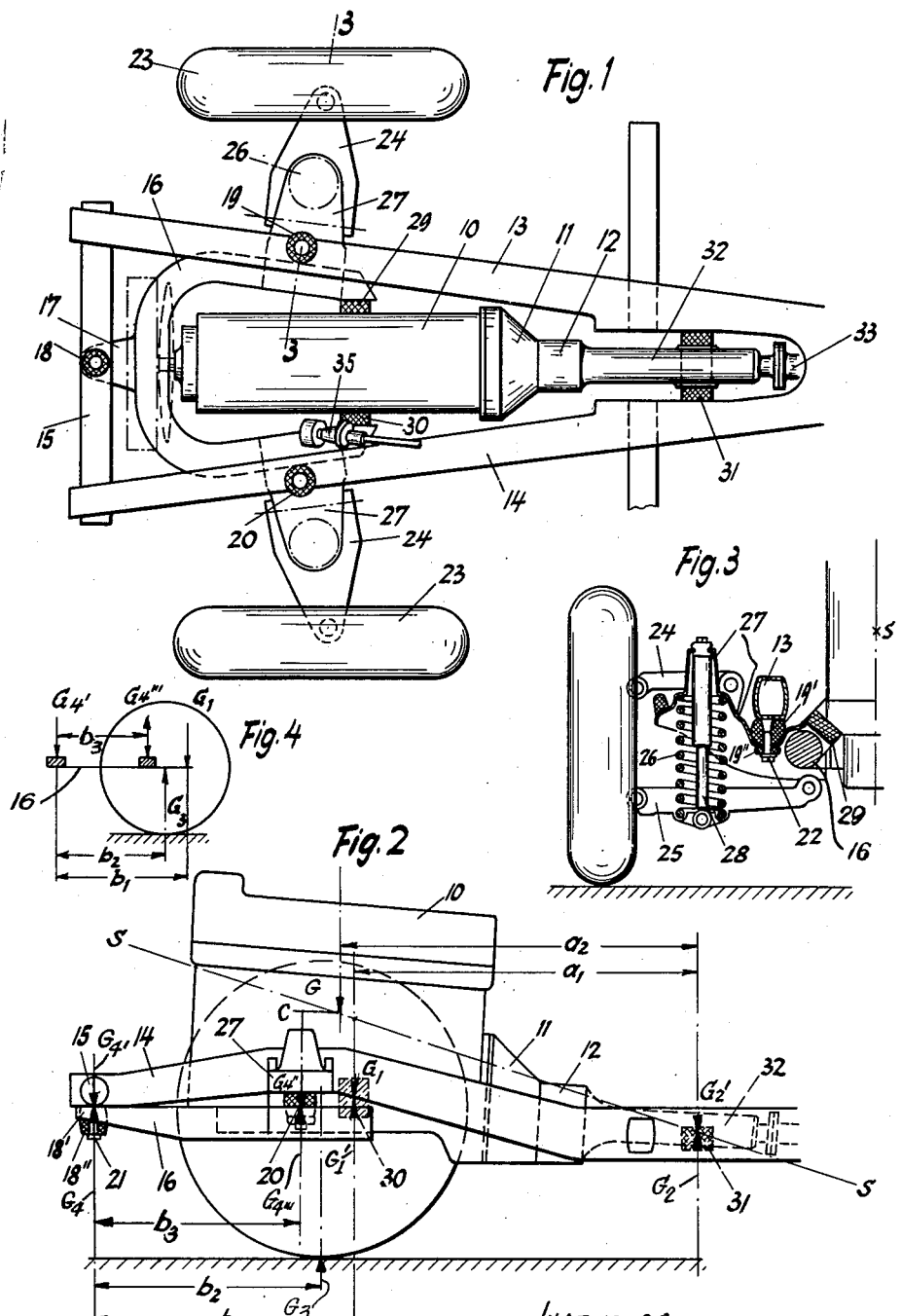

2,708,003

SUSPENSION OF A DRIVING AGGREGATE IN A MOTOR VEHICLE

Friedrich K. H. Nallinger and Josef Müller, Stuttgart, Germany, assignors to Daimler-Benz Aktiengesellschaft, Stuttgart-Unterturkheim, Germany Application February 6, 1952, Serial No. 270,216

17 Claims. (Cl. 180—64)

The present invention relates to the suspension of a driving aggregate—consisting particularly of an engine and transmission—in a motor vehicle by using an intermediate member which is flexibly, and particularly elastically, connected with the frame or body, as by means of hinges, if so desired.

It is an object of the present invention to provide such a suspension of the driving aggregate as to transmit to the frame or body as little as possible of the shocks which occur at the wheels of the vehicle.

A further object of the present invention is an improved bedding of the driving aggregate, particularly so as to keep shocks and vibrations, originating in the engine, off the chassis frame or off the body, as much as possible.

It is a further objective of the present invention to provide a suspension which simplifies the installation and facilitates the interchangeability of a driving aggregate or an auxiliary aggregate.

A further object of the present invention is a particularly advantageous development with respect to space as well as to the springing, if so desired, of the intermediate member which serves for supporting the driving aggregate and the axle aggregate.

Therefore it is an essential characteristic of the present invention that the driving aggregate, preferably outside the flexible or articulated connection of the intermediate member with the frame, is supported on the intermediate member with a lever arrangement so that the weight of the driving aggregate is transmitted to the road wheels substantially in the full amount thereof or with an upward leverage reaction. According to a further characteristic of the present invention the driving aggregate is supported on the intermediate member as well as at the frame so that the aggregate is supported on the intermediate member or on the road wheels, in a vertical plane through or nearly through the center of gravity of the driving aggregate, or in a plane between the mounting of the driving aggregate on the frame and the center of gravity, and accordingly, the weight of the driving aggregate is transmitted to the intermediate member or the road wheels substantially in the full amount thereof or with an upward leverage reaction. It is appropriate to support the intermediate member on the frame, and also the driving aggregate on the frame, on the sides of the center lines of the wheels opposite to each other or the mountings of the driving aggregate on the intermediate member.

By using an intermediate member between driving aggregate and frame carrying simultaneously the road wheels, the entire driving aggregate and axle aggregate can be assembled as one unit, and after assembling, fastened to the chassis frame as a unit.

By supporting the driving aggregate on the intermediate member with such a lever arrangement and by transmitting its weight to the road wheels in the full amount thereof or with an upward leverage reaction, the frame is completely or to a great extent relieved from the weight of the engine or there is obtained a force by the weight of the engine capable to counteract the weight of the frame, or the body. Simultaneously the driving aggregate burdening the axle or the intermediate member with its full weight acts as a mass deadening shocks and vibrations striking against the wheels or originating therefrom, before they are carried over to the frame. Simultaneously the vibrations originating from the engine are effectively taken up or absorbed before they are carried over to the frame.

According to a further expedient characteristic of the present invention the intermediate member is U-shaped, that is e. g. forked or horseshoe-shaped, preferably so that it is supported at the frame by means of its cross piece connecting the prongs, or a fork handle, while the prongs serve for supporting the driving aggregate, and for supporting the road wheels. In that case it is expedient to design the intermediate member so that the prongs may be resilient with respect to each other, particularly for the taking up of shocks on the road wheels. Such a design of the intermediate member has particular advantages, on the one hand, for reasons of space taken up by the driving aggregates located within, as well as, on the other hand, for obtaining an additional resilience.

Further details and advantages of the invention are to be found in the following description when taken in connection with the accompanying drawing which shows for purposes of illustration only one preferred embodiment in accordance with the present invention, and wherein the drawing shows in:

Figure 1 the horizontal plane of an embodiment of the front end of a running gear, Figure 2 the side view of the embodiment of Figure 1, including a partial force diagram, Figure 3 a section along line 3—3 of the Figure 1, and Figure 4 a diagram of the forces acting an the intermediate member.

In the illustrated embodiment in accordance with the present invention, the driving aggregate consisting essentially of the engine 10, the clutch housing 11, and the transmission 12 is arranged between the two side members 13 and 14 of the chassis frame which diverges V-shaped toward the front. The two side members of the frame are connected by a cross member 15 at the front end.

For the suspension of the driving aggregate and the wheels a horseshoe-shaped or forked intermediate member 16 is provided, whose ends are connected in front, and which embraces the front part of the engine 10 on both sides.

On the one hand, it is resiliently suspended at the front cross member 15 at 18 by means of a lug 17 pointing toward the front, and, on the other hand, at the frame side members 13 and 14 at 19 and 20. It is resiliently suspended at each of the three points, as particularly illustrated in Figures 2 and 3, by means of rubber rings 18', 18" and 19', 19" respectively arranged one upon the other, between which a wall of the intermediate member 16 is fixed by means of a plug 21 and 22 respectively, welded on to the frame. The dirigible front wheels 23 are guided independently of each other at the intermediate member by means of two control arms 24 and 25, and sprung against the intermediate member 16 by a coil spring 26 being supported with its bottom end on the lower control arm 25, and with its top end against a lateral bell-shaped lug 27 of the intermediate member. Within the coil spring a telescopic shock absorber 28 is disposed.

The driving aggregate 10, 11 and 12 is suspended, on the one hand, in a vertical cross plane passing approximately through the center of gravity C or, as in the case of the illustrated embodiment, lying behind slightly the center of gravity, in two rubber mountings 29 and 30 at the prongs of the intermediate member 16, and, on the other hand, supported on the frame at its rear end by a rubber bumper 31 which encloses, e. g. semi-ring-shaped, a tubular extension 32 of the gear box 12. The rubber mountings 29 and 30 are expediently also disposed in a circle whose center is approximately on a straight line passing through the center of gravity C.

The driving aggregate drives the rear wheels of the vehicle by means of a propeller shaft 33 with universal joints. Furthermore, the radiator 34, as well as the steering gear 35 are elastically supported on the intermediate member 16 as by means of elastic bumpers. Moreover, the horseshoe-shaped or forked intermediate member 16 can be designed so that its prongs can be made springy with respect to each other. Shocks striking against the road wheels in the direction of motion or athwart can thus be met particularly softly, owing to the flexibility of the intermediate member.

As shown in Figure 2, which illustrates the force diagram under static conditions, neglecting the weight of the frame and body as well as of other loads of the vehicle, the weight G of the drive aggregate is effective through the center of gravity C thereof, and is transmitted to the intermediate member with an upward leverage reaction as will be more fully described hereinafter.

The value of $G_1'$ which is the force produced by the intermediate member 16 on the drive aggregate 10, 11, 12, 32, 33 may be determined from the following equation:

$$\sum M_{31} = G \times a_2 - G_1' \times a_1 = 0$$

$$G_1' = \frac{a_2}{a_1} G \qquad (1)$$

where $G_1'$ is an upward force.

Since $a_2 > a_1$; $G_1' > G$.

Consequently, the force $G_1$ produced by the drive aggregate on the intermediate member 16 is equal and opposite to $G_1'$. Thus, the drive aggregate supports itself on the intermediate member 16 with a downward force $$G_1 = G \times \frac{a_2}{a_1}$$

The value of $G_2'$ which is the force produced by the frame 13, 14 on the drive aggregate may be found from the following equation:

$$\sum M_{29,30} = G \times (a_2 - a_1) = G_2' a_1$$

$$G_2' = G \times \frac{a_2 - a_1}{a_1} \qquad (2)$$

where $G_2'$ is a downward force.

Consequently the force $G_2$ produced by the drive aggregate on the frame 13, 14 at point 31 is equal and opposite to $G_2'$ i. e., an upwardly directed force which approaches zero as the transverse plane passing through supports 29, 30 approaches the transverse plane through the center of gravity C of the drive aggregate.

The force $G_4$, which is the force produced by the intermediate member 16 on the frame cross member 15 at lug 17 may be found from the following equation:

$$\sum M_{19,20} = G_2 \times (a_1 + b_1 - b_3) - G_4 \times b_3 = 0$$

$$G_4 = G_2 \frac{a_1 + b_1 - b_3}{b_3} \qquad (3)$$

where $G_4$ is an upward force.

Consequently the force $G_4'$ produced by the frame cross member 15 on the intermediate member 16 at lug 17 is equal and opposite to $G_4$, i. e., a downwardly directed force as shown in Figure 2.

The force $G_4''$, which is the force produced by the intermediate member 16 on the frame 13 and 14 at supports 19 and 20 may be found from the following equation:

$$\sum M_{18} = G_2 \times (a_1 + b_1) - G_4'' \times b_3 = 0$$

$$G_4'' = G_2 \times \frac{a_1 + b_1}{b_3} \qquad (4)$$

where $G_4''$ is a downwardly directed force.

Consequently the force $G_4'''$, which is the force produced by the frame 13, 14 on the intermediate member 16 at supports 19 and 20 is equal and opposite to $G_4''$, i. e., an upwardly directed force.

From Equations 3 and 4 it can be seen that forces $G_4$, $G_4'$, $G_4''$ and $G_4'''$ are all a function of $G_2$ which itself is very small and which can be made negligibly small. Consequently, the following equation setting forth the value of the force $G_3$ with which the drive aggregate supports itself on the road, holds substantially true:

$$\sum M_{18} = G_1 \times b_1 - G_3 \times b_2 = 0$$

$$G_3 = G_1 \times \frac{b_1}{b_3} \qquad (5)$$

where $G_3$ is an upwardly directed force numerically greater than $G_1$.

The above calculations relate to the static conditions of the vehicle structure which are however less important than the dynamic conditions as the force $G_3$, insofar as it is caused by the weight G of the drive aggregate, is independent on how the drive aggregate 10, 11, 12 supports itself on the auxiliary frame or intermediate member 16 or on the chassis frame.

The static calculations, however, clearly demonstrate, that the weight of the drive aggregate, with possibly an upward leverage action, supports itself directly on the auxiliary frame and thereby via the auxiliary frame on the wheels, without being transmitted or supported on the main frame. The weight of the motor thereby acts directly to dampen the movements and shocks of the wheels without being first rendered noticeable on the main frame.

Whether the force $G_4''$ is actually directed upwardly or downwardly, depends on the relationship of the forces $G_1$ and $G_4$ with respect to $G_3$ and the lever arms used in the construction as well as on the weight of the main frame and body which have been neglected in the above calculations.

The dynamic conditions of the existing forces, which are of greater importance than the static conditions, nevertheless are closely related to the static conditions of the arrangement of the motor or drive aggregate 10 on the auxiliary frame 16.

If, for example, one takes the moments about a point near $G_4$ on the auxiliary frame then the weight G of the motor is effective thereat in a clockwise direction with a lever arm $b_1$. Shocks and vibrations which act on the auxiliary frame 16 from the road in the direction of $G_3$, thereby tend to turn the auxiliary frame in a counter-clockwise direction about the point $G_4$. However, the weight G of the drive aggregate acts in opposition to such shocks and vibrations, and the more so the further away from $G_4$ the motor supports itself on the auxiliary frame.

Thus, from a consideration of the dynamic conditions, it is desirable to support the motor or drive aggregate on the auxiliary frame at as large as possible a distance from the connection of the auxiliary frame with the main frame.

Furthermore, the actual point of rotation of the auxiliary frame, which is connected at three points 18, 19 and 20 with the main frame, depends on the relative softness and resiliency of the rubber bumpers used, which determines whether such point is near point 18 or near points 19 and 20.

By such a support of the driving aggregate on the intermediate member and, along with it, on the wheels, the frame is most appropriately relieved of the reaction forces originating in the engine. The mass of the driving aggregate supported on the intermediate member acts simultaneously as a damping mass between wheels and frame, so that shocks coming from the roadway can practically not be carried on to the frame or body. By supporting the engine on the intermediate member with a lever arrangement enlarging the supporting forces this effect can be increased inasmuch as there are produced forces at this intermediate member directed upward, counteracting the weight of the body and the frame.

The rubber bumpers 29, 30, 31, by means of which the driving aggregate is disposed on the intermediate member 16, or on the frame, are expediently connected with the parts concerned by vulcanizing, so that they can efficiently take up transverse forces producing shearing stresses, e. g. caused by torques around the axis s—s as well as forces in a vertical direction, if so desired. The axis s—s lies in a vertical longitudinal plane of the vehicle and passes through the center of gravity C and the support of the tubular extension 32 on rubber bumper 31. The rubber bumpers at the mountings 18, 19 and 20 are appropriately designed so as to be able to damp vertical as well as horizontal forces. Here the rubber bumpers at 19 and 20 can, e. g., be made softer than at the front mounting or suspension 18, which may also be nonresilient, so that the intermediate member 16 can yield elastically particularly around the mounting or suspension acting in this case as a joint.

The invention is not restricted to the illustrated embodiment. For instance, the wheels suspended at the intermediate member may be driven by the driving aggregate. Furthermore the invention may be applied to both rear axle drives and front axle drives, where the driving aggregate can be disposed at the front as well as at the rear. The guidance and spring suspension of the wheels may be designed at will. The suspension of the driving aggregate in or approximately in the cross plane of the center of gravity may also be applied independent of the design of the intermediate member, and the forked or horseshoe-shaped form of the intermediate member independent of the suspension of the driving aggregate in the cross plane of its center of gravity. However, the combination brings about favorable conditions both concerning the engine and axle suspensions and with regard to the damping effect of the mass of the engine.

What we claim is:

1. In a motor vehicle a main frame, a driving aggregate, an intermediate member, a pair of opposite vehicle wheels, means for supporting said wheels on the intermediate member, flexible means for resiliently supporting said intermediate member on the main frame substantially on one side of the center axis of the vehicle wheels as seen in a plan view of the vehicle, said intermediate member extending beyond the said center axis toward the opposite side, and means for supporting the driving aggregate on the extension of the intermediate member in such a way that substantially the entire weight of said driving aggregate rests on said extension and is thereby transmitted in increased amount to said support means for said vehicle wheels.

2. In a motor vehicle the combination according to claim 1, in which said resilient means comprises an elastical bumper located at a relatively great distance from the center axis of the vehicle wheels, and elastical bumpers located on both sides of the driving aggregate near the center axis of the wheels, the three bumpers defining an elastical mounting of the intermediate member in at least three points, the driving aggregate being so disposed that practically its full weight supports itself on the means serving for its mounting on the extension of said intermediate member.

3. In a motor vehicle the combination according to claim 1, in which the means for supporting the driving aggregate on the intermediate member, is formed by elastical bumpers.

4. In a motor vehicle the combination according to claim 1, in which the driving aggregate is disposed so that its center of gravity is located above the extending portion of the intermediate member.

5. In a motor vehicle a main frame, a driving aggregate, a horseshoe-shaped intermediate member encircling the driving aggregate on one front side, flexible means for resiliently supporting said intermediate member on the side of the cross part of said member at the main frame, a pair of wheels on both sides of the driving aggregate, means for springily supporting said wheels on the legs of the horseshoe-shaped intermediate member, said legs of the horseshoe-shaped intermediate member extending beyond said last-named means, and means for supporting said driving aggregate on the said legs, the driving aggregate being supported on the extensions of said horseshoe-shaped intermediate member in such manner that practically the full weight thereof supports itself on said legs.

6. In a motor vehicle the combination according to claim 5, in which the last-mentioned means is also elastic.

7. In a motor vehicle the combination according to claim 5, furthermore comprising elastical means for supporting the end of the driving aggregate opposite to the U-shaped cross member on the main frame.

8. In a motor vehicle a frame having side members diverging V-shaped toward one end of the vehicle, and a cross member connecting the ends of the said side members, a driving aggregate within the space formed by said side members and the cross member, a U-shaped intermediate member, the cross part of said U-shaped member being adjacent to the cross member and the legs thereof extending substantially in the direction of the side members toward the center of the vehicle so that the intermediate member surrounds the driving aggregate at one end and along a portion of both sides thereof, means for elastically supporting said intermediate member at the cross part thereof on said cross member, means for elastically supporting said intermediate member at the legs thereof on said side members, two wheels opposed to each other on both sides of the driving aggregate, means for suspending said wheels on said intermediate member, means for supporting said driving aggregate on the legs of the intermediate member, and means for supporting said driving aggregate at the frame in the neighbourhood of the neck of the V.

9. In a motor vehicle the combination according to claim 8, in which the said means for supporting the intermediate member on the frame, and the said means for supporting the driving aggregate on the intermediate member and on the frame, comprise elastical bumpers.

10. In a motor vehicle the combination according to claim 8, in which the said means for supporting the driving aggregate on the legs of the intermediate member are located in a plane closely adjacent to a vertical cross plane in which the center of gravity of the driving aggregate lies.

11. In a motor vehicle a frame with two side members and a cross member, a driving aggregate between the side members and the cross member, a U-shaped intermediate member, whose cross part is adjacent to the cross member, and whose legs surround the driving aggregate at one end and along a portion of both sides thereof, elastic means for resiliently supporting said intermediate member by means of its cross part on the cross member, elastic means for resiliently supporting said intermediate member by means of its legs on said side members, two vehicle wheels located opposite to each other on both sides of the driving aggregate, means for suspending said wheels on the legs of the intermediate member, elastic means for supporting said driving aggregate on the legs of the intermediate member so that the center of gravity of the driving aggregate lies adjacent to the vertical plane passing through the last-mentioned elastic means, and elastic means for resiliently supporting said driving aggregate on said frame on the side opposite said cross member.

12. In a motor vehicle the combination according to claim 8, in which the intermediate member at its cross part includes a lug directed toward the end of the vehicle for the support thereof on the cross member, and parts at its legs directed outwardly for connection with said means for suspending the vehicle wheels.

13. In a motor vehicle a frame, a driving aggregate, a U-shaped intermediate member having a cross-portion and two leg members, said cross-portion being adjacent one end of said vehicle and said leg members extending toward the center of said vehicle, elastic means for supporting said cross-portion on said frame, elastic means for supporting said leg members of said intermediate member on said frame, two wheels, wheel suspending means connected with said intermediate member including means for connecting each of said wheels with one of said leg members to provide upward and downward movement of each wheel, and means for springily supporting each wheel on said leg members, said leg members extending longitudinally beyond said springily supporting means, elastic means for supporting said driving aggregate on the extensions of said leg members, elastic means for supporting said driving aggregate on said frame opposite the cross-portion of said intermediate member, said driving aggregate being supported on said intermediate member in such a manner that the weight of said driving aggregate at least almost completely rests on said extensions of said leg members.

14. In a motor vehicle the combination according to claim 13, in which the said means for supporting the driving aggregate at the legs of the intermediate member comprises rubber parts being substantially subjected to shearing stress.

15. In a motor vehicle a frame, an intermediate member, means for resiliently supporting one end of said intermediate member on said frame, a driving aggregate, means for freely supporting said driving aggregate on said intermediate member opposite said first-named means whereby the weight of said driving aggregate on said intermediate member produces a moment about said first-named means, two wheels on opposite sides of said driving aggregate, means for springily supporting said wheels only on said intermediate member between said first-named means and said second-named means whereby the effective weight of said driving aggregate on said wheels is magnified as a result of the lever system used therein.

16. The combination according to claim 15 wherein said second-named means lies in a plane closely adjacent to a vertical cross plane in which the center of gravity of said driving aggregate lies.

17. In a motor vehicle the combination according to claim 8, wherein said means for suspending the wheels on the intermediate member comprises means for independently guiding said wheels, means for connecting said wheels with the legs of said intermediate member for up and down movement, and spring means for springing said wheels against the legs of said intermediate member.

References Cited in the file of this patent

UNITED STATES PATENTS

| 1,948,745 | Curtiss | Feb. 27, 1934 |
| 1,950,637 | Taub | Mar. 13, 1934 |
| 2,346,123 | Willson | Apr. 4, 1944 |

FOREIGN PATENTS

| 401,728 | France | Aug. 5, 1909 |
| 522,900 | Great Britain | July 1, 1940 |
| 539,373 | France | June 24, 1922 |